US012766501B2

(12) United States Patent
Jeon

(10) Patent No.: US 12,766,501 B2
(45) Date of Patent: Oct. 20, 2026

(54) BLOOD SEPARATION TUBE COMPRISING CELL ACTIVATION PART

(71) Applicant: Min Yong Jeon, Seoul (KR)

(72) Inventor: Min Yong Jeon, Seoul (KR)

( * ) Notice: Subject to any disclaimer, the term of this patent is extended or adjusted under 35 U.S.C. 154(b) by 595 days.

(21) Appl. No.: 18/032,557

(22) PCT Filed: Oct. 14, 2021

(86) PCT No.: PCT/KR2021/014276

§ 371 (c)(1),
(2) Date: Apr. 18, 2023

(87) PCT Pub. No.: WO2022/086059

PCT Pub. Date: Apr. 28, 2022

(65) Prior Publication Data

US 2023/0390760 A1 Dec. 7, 2023

(30) Foreign Application Priority Data

Oct. 19, 2020 (KR) ........................ 10-2020-0135152
Sep. 29, 2021 (KR) ........................ 10-2021-0128834

(51) Int. Cl.
*B01L 3/00* (2006.01)

(52) U.S. Cl.
CPC ... *B01L 3/50215* (2013.01); *B01L 2300/0672* (2013.01); *B01L 2300/0832* (2013.01); *B01L 2400/0478* (2013.01)

(58) Field of Classification Search
CPC ......... B01L 3/50215; B01L 2300/0672; B01L 2300/0832; B01L 2400/0478;
(Continued)

(56) References Cited

U.S. PATENT DOCUMENTS 7,074,577 B2 7/2006 Haubert et al.
2004/0067536 A1 4/2004 Haubert et al.
(Continued)

FOREIGN PATENT DOCUMENTS

CN 106573256 A 4/2017
EP 0310205 A2 * 4/1989 ........... B01D 61/025
(Continued)

OTHER PUBLICATIONS

KR First Office Action dated Dec. 15, 2021 as received in Application No. 10-2021-0128834.
(Continued)

*Primary Examiner* — Charles Capozzi
*Assistant Examiner* — Michael Stanley Gzybowski
(74) *Attorney, Agent, or Firm* — Maschoff Brennan

(57) ABSTRACT

The present invention relates to a blood separation tube used in centrifugation devices and, more specifically, to a blood separation tube comprising a cell activation part configured to generate physical stress through collision with blood being centrifuged, so that blood cells in the blood, such as platelets, white blood cells, and lymphocytes, can be activated. To this end, the present invention comprises: a tube body having a chamber for accommodating blood; and a cell activation part which protrudes from the inner surface or inside of the chamber so as to activate blood cells through physical collision with blood being centrifuged.

12 Claims, 11 Drawing Sheets

(58) Field of Classification Search
CPC ....... B01L 2300/042; B01L 2300/0858; B01L 2400/086; B01L 3/5021; G01N 33/491; A61M 1/0272; A61M 1/029
See application file for complete search history.

(56) References Cited

U.S. PATENT DOCUMENTS

| | | | | |
|---|---|---|---|---|
| 2014/0356254 | A1 | 12/2014 | Lee et al. | |
| 2016/0157767 | A1 | 6/2016 | Bartfeld et al. | |
| 2017/0081627 | A1 | 3/2017 | Hwang | |
| 2018/0010990 | A1 * | 1/2018 | Cherubini | B01L 3/5021 |
| 2019/0299173 | A1 | 10/2019 | Park et al. | |

FOREIGN PATENT DOCUMENTS

| | | | | |
|---|---|---|---|---|
| JP | 61-501494 | A | 7/1986 | |
| JP | 2004517680 | A | 6/2004 | |
| JP | 2015502851 | A | 1/2015 | |
| KR | 20-0462858 | Y1 | 10/2012 | |
| KR | 10-2012-0129779 | A | 11/2012 | |
| KR | 10-2014-0093821 | A | 7/2014 | |
| KR | 10-1429253 | B1 | 8/2014 | |
| KR | 20150029261 | A | 3/2015 | |
| KR | 101666451 | B1 * | 10/2016 | A61J 10/05 |
| KR | 10-1723341 | B1 | 4/2017 | |
| KR | 10-1736374 | B1 | 5/2017 | |
| RU | 2552411 | C2 | 6/2015 | |
| RU | 2014122776 | A | 2/2016 | |
| RU | 2698723 | C1 | 8/2019 | |

OTHER PUBLICATIONS

KR Second Office Action dated Aug. 26, 2022 as received in Application No. 10-2021-0128834.

Decision to Grant Dated Oct. 24, 2022 as received in Application No. 10-2021-0128834.

* cited by examiner

BLOOD SEPARATION TUBE COMPRISING CELL ACTIVATION PART

TECHNICAL FIELD

The present invention relates to a blood separation tube used in a centrifugal separator, and more particularly, to a blood separation tube including a cell activation part configured to activate blood cells including platelets, white blood cells, and lymphocytes in blood by generating physical stress through collision with blood being centrifuged.

BACKGROUND ART

In general, blood carries oxygen from the lungs to tissue cells and carries carbon dioxide from tissues to the lungs to release the carbon dioxide outside, carries nutrients absorbed by the digestive tract to organs and tissue cells, carries unnecessary breakdown products secreted from tissues to the kidneys to expel the breakdown products from the body, transports hormones secreted from the endocrine glands to organs and tissues where the hormones act, distributes body heat evenly to maintain a constant body temperature, and destroys and detoxifies germs and foreign substances that have invaded the body. As such, blood performs various bodily functions.

Blood may be largely divided into hemocytes and plasma. Hemocytes are cell components of blood, account for about 45% of the total blood volume, and are composed of red blood cells, white blood cells, and platelets. Here, red blood cells make up most (99%) of hemocytes.

In addition, plasma is a pale yellow liquid component of blood and accounts for about 55% of the total blood volume. Most of plasma is composed of water (91%). In addition to water, plasma contains plasma proteins (7%) such as albumin and coagulation factors, electrolytes ($Na^+$, $Cl^-$, $HCO_3^-$, $K^+$, etc.), glucose, amino acids, lipids, vitamins, waste products, hormones, and the like.

Blood is used as a major indicator for determining various diseases or health conditions, and each of red blood cells, white blood cells, platelets, monocytes, and lymphocytes constituting blood is separated and used for various therapeutic or research purposes.

Accordingly, blood separation is a key process for material analysis, cell culture, and identification and amplification of DNA in the fields of biology, genetics, and medicine.

When collected blood is centrifuged using a centrifugal separator, blood is separated into plasma and hemocytes, and hemocytes are divided into a buffy coat layer and a red blood cell layer. Plasma components located in the uppermost layer include water containing fibrinogen, $Na^+$, $Cl^-$, fibrinogen, and the like.

In addition, red blood cells are located in the lowest layer due to the large specific gravity thereof, and white blood cells and platelets are contained in a buffy coat located between red blood cells and plasma components.

After centrifugation, the separated red blood cells, white blood cells, platelets, and plasma are extracted from a blood separation tube using an injection needle and used for treatment or research purposes.

For example, platelets included in blood are mainly present in plasma, and plasma is divided into platelet-rich plasma (PRP) and platelet-poor plasma (PPP). Thereamong, PRP has been used for therapeutic purposes. As a specific example, when PRP is implanted in painful knees, ligaments, muscles, etc., PRP stimulates stem cells to promote cell generation.

PRP contains 2 to 7 times more platelets and 3 to 5 times more white blood cells or monocytes than normal blood. Growth factors secreted from platelets are known to promote cell regeneration in wounds and help wound healing and cell or tissue regeneration.

As a clinical method to further enhance the effect of PRP, platelets are pre-activated by adding a cell activator (domestic clinical trials: calcium, overseas clinical trials: collagen, thrombin chemical, or platelet activating protein) so that the platelets secrete growth factors, and then the activated platelets are injected.

However, when calcium is injected into the cartilage, the calcium is neutralized and has no effect. When calcium is injected into subcutaneous fat, side effects such as flushing, skin rash, and pain may be induced. In addition, since thrombin and collagen are substances directly involved in blood coagulation, thrombin and collagen may act as potential risk factors when injected into a patient without complete separation. Accordingly, there is a need for improved methods of adding these substances.

Accordingly, a method of activating platelets by applying physical stress instead of adding a chemical activator has been reported. Based on this method, (Patent Document 0001) Korean Patent Application Publication No. 10-2012-0129779 has been proposed.

Korean Patent Application Publication No. 10-2012-0129779 disclosed a platelet activation device including a passage having an inner diameter of less than 2 mm for applying capillary stress to a biological fluid including platelets, an accommodating portion for accommodating the passage, and at least one entrance formed at both ends of the accommodating portion and capable of injecting or discharging the biological fluid. Using this device, activated platelets may be obtained by repeatedly passing a biological fluid through the capillary passage.

However, in Korean Patent Application Publication No. 10-2012-0129779, the passage has a structure in which a narrow area and a wide area are alternately formed, and platelets are activated by this structural feature. Since a plurality of patterns are alternately formed inside the minute passage, the passage is difficult to form. In addition, since the passage is composed of a single channel, to activate platelets, the number of times blood passes through the passage inevitably increases as the amount of blood increases. Accordingly, it may take a lot of time to activate platelets.

To solve these problems, (Patent Document 0002) Korean Patent No. 10-1429253 disclosed a platelet activating device including a multi-channel blood passage. According to the invention, syringes are respectively installed at an inlet and outlet provided at both ends of the long platelet activating device. The pistons of both syringes must be reciprocated several times with great force to reciprocate blood as the blood passes through the platelet activator. Due to this operating method, the user's stress may be increased. In addition, a process of collecting centrifuged blood, injecting the blood into a separate device, and then applying physical stress is required.

Therefore, there is increasing demand for development of a blood separation tube that has a simple structure and allows omission of a double centrifugation process and a process of applying a separate physical stress after centrifugation to reduce the stress of medical staffs and prevent cell contamination in a transfer process.

DISCLOSURE

Technical Problem

Therefore, the present invention has been made in view of the above problems, and it is one object of the present invention to provide a blood separation tube used in a centrifugal separator, and more particularly, to provide a blood separation tube including a cell activation part configured to activate blood cells including platelets, white blood cells, and lymphocytes in blood by generating physical stress through collision with blood being centrifuged.

Technical Solution

In accordance with one aspect of the present invention, provided is a blood separation tube including a tube body having a chamber for receiving blood; and a cell activation part provided in a protruding shape on an inner surface of the chamber or inside the chamber to activate blood cells by physically colliding with centrifuged blood.

The cell activation part may include any one of a plurality of fine uneven walls formed on an inner surface of the chamber, having a certain height and width, and configured to protrude in a longitudinal direction and a plurality of fine protrusions formed on the inner surface of the chamber, arranged at a certain interval, and configured to protrude.

When necessary, the cell activation part may further include a plurality of collision partitions formed to have a certain height and width in a longitudinal direction on the inner surface of the chamber and configured to protrude further than the fine uneven walls or the fine protrusions.

Preferably, the fine uneven walls and the collision partitions may be placed parallel to a central axis of the tube body.

In addition, when necessary, the cell activation part may further include a rod-shaped activation column formed on a lower portion of the chamber and having an outer circumferential surface on which a plurality of fine uneven walls or fine protrusions protruding in a longitudinal direction is formed.

In addition, when necessary, the cell activation part may be an activation bar installed in the chamber, having a length greater than a width or diameter of the chamber, and having an outer circumferential surface on which embossed patterns in a form of fine grooves or fine protrusions are formed.

In addition, the chamber of the tube body may consist of an upper chamber of a cylindrical shape having a predetermined diameter and length and a lower chamber connected to the upper chamber and configured to extend from a lower end of the upper chamber while gradually narrowing downward.

As another embodiment, the chamber of the tube body may consist of an upper chamber of a cylindrical shape having a predetermined diameter and length; an intermediate chamber of a cylindrical shape having a narrow tube portion gradually narrowing from a lower end of the upper chamber, having a predetermined diameter less than a diameter of the upper chamber, and configured to extend downward from the narrow tube portion; and a lower chamber of a cylindrical shape having a wide tube portion gradually widening from a lower end of the intermediate chamber, having a predetermined diameter greater than a diameter of the intermediate chamber, and configured to extend downward from the wide tube portion.

The cell activation part may include any one of a plurality of fine uneven walls formed on an inner surface of the chamber, having a certain height and width, and configured to protrude in a longitudinal direction and a plurality of fine protrusions formed on the inner surface of the chamber at a predetermined interval and configured to protrude, and the cell activation part may be formed in any one of the upper chamber and the lower chamber.

In addition, the cell activation part may further include a plurality of collision partitions formed to have a certain height and width in a longitudinal direction on an inner surface of the upper chamber, configured to protrude further than the fine uneven walls or the fine protrusions, and disposed at a predetermined interval.

In addition, as another embodiment, the chamber of the tube body may consist of an upper chamber having a predetermined diameter and length and a lower chamber of a cylindrical shape configured to extend from a lower end of the upper chamber while gradually widening downward and having a predetermined diameter and length greater than those of the upper chamber.

In addition, the lower chamber of the present invention may have an open bottom surface.

The lower chamber may further include a lower portion stopper detachably coupled thereto by including lower portion packing for sealing the opened bottom surface.

The cell activation part may further include a rod-shaped activation column formed on the lower portion stopper or the lower portion packing and having an outer circumferential surface on which a plurality of fine uneven walls or fine protrusions protruding in a longitudinal direction is formed.

In addition, when necessary, the lower portion stopper or the lower portion packing may be configured to move up and down along an inner circumferential surface or outer circumferential surface of the lower chamber by an external force.

Advantageous Effects

According to the structural features of a blood separation tube including a cell activation part of the present invention, during centrifugation, blood physically collides with the cell activation part due to a vortex generated in the blood separation tube, and physical stress is applied to the blood. In addition, the blood separation tube has a simple structure and is easy to manufacture. In addition, when the blood separation tube is used, a double centrifugation process and a process of applying a separate physical stress after centrifugation can be omitted, thereby reducing the stress of medical staffs and preventing cell contamination in a transfer process.

In addition, since a buffy coat to which physical stress is applied by the cell activation part is moved to an intermediate chamber with a narrow diameter without loss, medical staffs can collect the buffy coat intact while visually checking the buffy coat.

In addition, since blood is activated through physical collision with the cell activation part, a process of injecting a separate cell activator into the blood separation tube can be omitted. Accordingly, cell activation can be easily performed, and introduction of fine silica powder into the human body, which may occur when the cell activator is injected, can be prevented in advance.

In addition, fine uneven walls formed parallel to the central axis of a tube body play a role in inducing red blood cells having a high specific gravity to easily move to the bottom along the fine uneven walls without staying at the top during centrifugation. Thus, during centrifugation, red blood cells do not stay in an upper chamber and move quickly to a lower chamber, so that a clean buffy coat and blood plasma can be obtained.

In addition, a plurality of fine uneven walls and collision partitions increase the area where physical collision occurs, so that physical stress can be easily applied to centrifuged blood to effectively activate blood cells.

In addition, an activation column and an activation bar, which constitute the cell activation part, play a role in stirring lower blood when the blood separation tube rotates in an angle-type centrifugation process. By this operation, white blood cells and platelets with low specific gravity existing between bulky red blood cells easily ascend to the middle layer of the blood separation tube, thereby increasing blood separation efficiency.

BEST MODE

Figure 1A:
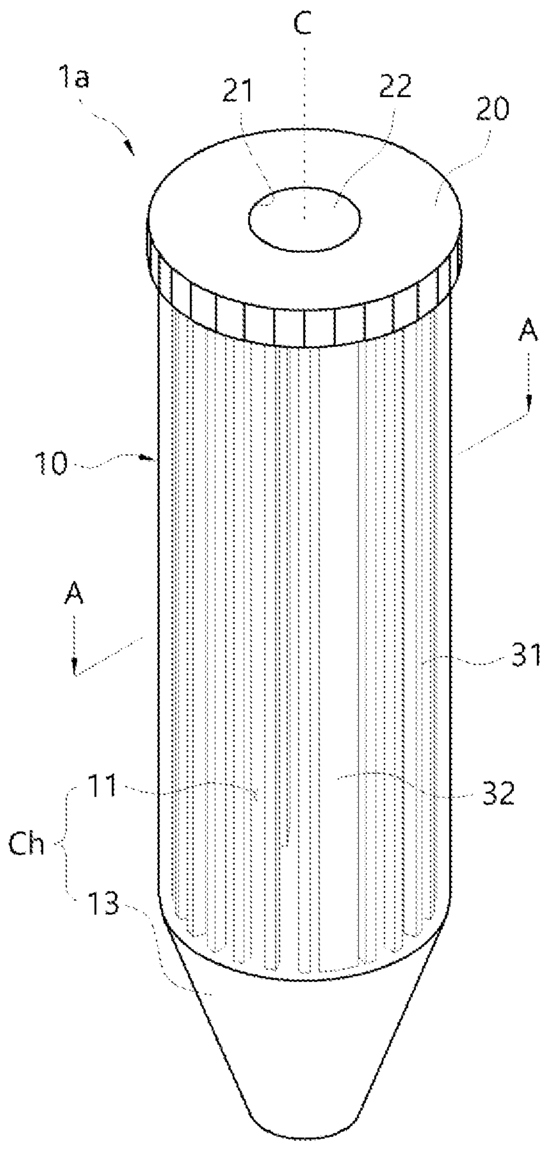
FIGS. 1A and 1B are diagrams showing an example of a blood separation tube including a cell activation part according to the present invention.

The present invention provides a blood separation tube including a tube body having a chamber for receiving blood; and a cell activation part provided in a protruding shape on the inner surface of the chamber or inside the chamber to activate blood cells by physically colliding with centrifuged blood.

Mode for Invention

In describing the present invention, the upper part or upper direction refers to the part or direction in which an upper stopper 20 is shown based on the drawings shown, and the lower part or lower direction refers to the opposite part or direction.

In addition, in describing the present invention, when a specific description of a related known function or configuration obscures the gist of the present invention, the description thereof will be omitted.

In addition, when a part "includes" a certain component, this means that the part may further include other components, not excluding other components, unless specified otherwise.

In addition, in order to explain a component including the term "fine" throughout the present invention, the component including the term "fine" is exaggeratedly shown throughout the drawings. A fine component is a component having a "very small" size so that a user cannot perceive the component in actual application.

Hereinafter, preferred embodiments of a blood separation tube including a cell activation part according to the present invention will be described in detail with reference to the accompanying drawings.

In blood separation tubes 1*a* to 1*e* including a cell activation part according to an embodiment of the present invention, blood is accommodated in the chamber (Ch) of a tube body 10. During centrifugation, swirling blood collides with a cell activation part formed to protrude in the chamber (Ch), resulting in physical collision. The resulting physical stress enables activation of blood cells, such as platelets, white blood cells, and lymphocytes, which constitute hemocytes and plasma in the blood.

That is, as a key feature, the blood separation tube including a cell activation part according to the present invention includes a cell activation part formed in a protruding shape inside a chamber so that the cell activation part collides with blood during centrifugation. The cell activation part and the tube body have various embodiments.

More specifically, embodiments of the present invention are described as follows.

For example, as shown in FIGS. 1A to 4B, the blood separation tubes 1*a* and 1*b* including a cell activation part according to an embodiment of the present invention include the tube body 10 having a chamber (Ch) for receiving blood. A cell activation part that physically collides with centrifuged blood and activates blood cells is provided in a protruding shape on the inner surface of the chamber (Ch) or inside the chamber (Ch).

According to one embodiment, the above-described tube body 10 has a hollow cylindrical shape in which an upper inlet side is opened and a chamber (Ch), which is an accommodation space, is formed therein.

Specifically, the chamber (Ch) according to an embodiment has a hollow cylindrical shape and is divided into an upper chamber 11 and a lower chamber 13.

The upper chamber 11 has a cylindrical shape having a predetermined diameter and length like the shape of the tube body 10. The lower chamber 13 is connected to the upper chamber 11, extends from the lower end of the upper chamber 11, and has a shape gradually narrowing downward. The bottom of the lower chamber 13 is sealed.

In addition, on one side of the inner surface of the chamber (Ch) of the tube body 10, a cell activation part configured to physically collide with swirling blood during centrifugation is formed.

For example, the cell activation part has a structure including any one of a plurality of fine uneven walls formed on the inner surface of the chamber (Ch), having a certain height and width, and configured to protrude in the longitudinal direction and a plurality of fine protrusions 35 (FIG. 5) formed on the inner surface of the chamber (Ch) and configured to protrude.

Preferably, the fine uneven walls 31 are radially formed along the inner surface of the chamber (Ch) at a predetermined interval.

As shown in the figures, the cell activation part is formed in the upper chamber 11 constituting the chamber (Ch) and has the form of the fine uneven walls 31, but the present invention is not limited thereto. When necessary, as shown in FIG. 1B, the cell activation part may be formed in the lower chamber 13.

In addition, the fine uneven walls 31 formed on the inner surface of the upper chamber 11 are arranged parallel to each other at a predetermined interval with respect to the central axis (C) of the tube body 10. Accordingly, the fine uneven walls 31 are formed to protrude vertically in the longitudinal direction on the inner surface with respect to the tube body 10.

In addition, the fine uneven walls 31 are shown to be formed in the form of a rectangular line protruding toward the central axis (C) side of the inner surface of the chamber, but the present invention is not limited thereto. The fine uneven walls 31 may be formed in the form of a semi-cylindrical line or a corrugated column line.

As will be described later, the fine uneven walls 31 most preferably have a protruding rectangular line shape so that red blood cells having a high specific gravity easily move to the lower chamber side during centrifugation.

The cell activation part is configured by forming the fine uneven walls 31 at a predetermined interval along the inner circumferential surface on the inner surface of the tube body 10.

In addition, when centrifugation is performed using a centrifugal separator while blood is received in the chamber (Ch) in the tube body 10 of the blood separation tube including a cell activation part, blood swirls in the chamber (Ch) of the tube body 10 during centrifugation.

At this time, flow velocity is generated according to flow of blood in the chamber (Ch) of the tube body 10, hemocytes included in the blood also swirl rapidly at the same time, and the hemocytes collide with the fine uneven walls 31 of the tube body 10 during swirling and receive physical stress.

In addition, as described above, the fine uneven walls 31 are formed continuously and long along the longitudinal direction of the tube body 10. The fine uneven walls 31 increase activation rate in blood cells by increasing the collision area with blood and sufficiently applying physical stress to the hemocytes of the blood being centrifuged.

In addition, by arranging the fine uneven walls 31 side by side with respect to the central axis of the tube body 10, slide action of a mold core may be smoothly performed during a manufacturing process of a tube, thereby reducing manufacturing costs.

In addition, the cell activation part including the fine uneven walls 31 induces red blood cells having a high specific gravity constituting hemocytes to move easily to the lower portion of the tube body 10 rather than remaining in the upper portion of the tube body 10 during centrifugation, that is, induces red blood cells to move easily to the lower chamber 13 rather than remaining in the upper chamber 11.

That is, during centrifugation, red blood cells in blood do not stay in the upper chamber 11, but move quickly to the lower chamber 13 along the fine uneven walls 31 constituting the cell activation part, so that a clean buffy coat and plasma may be extracted.

In addition, referring again to the figures, the cell activation part constituting the blood separation tubes 1*a* and 1*b* of the present invention further includes the collision partitions 32 formed to have a certain height and width in the longitudinal direction on the inner surface of the chamber (Ch), configured to protrude further toward the central axis than the fine uneven walls 31, and arranged at a predetermined interval.

The collision partitions 32 are formed to protrude further toward the central axis (C) than the fine uneven walls 31 and to be parallel to the central axis of the tube body 10.

In addition, the collision partitions 32 are provided between the above-described fine uneven walls 31, and the ends thereof are narrowed toward the central axis (C). As a preferred embodiment, the cross section of the collision partitions 32 has a trapezoidal shape.

The collision partitions 32 of a trapezoidal shape allow effective collision during centrifugation and facilitate downward movement of red blood cells along the collision partitions 32.

In this way, by further including the collision partitions 32 in the cell activation part 30, blood located in the center of the tube body 10 and blood located on the inner surface side of the tube body 10 may be uniformly mixed. As a result, an effect of uniformly applying physical stress to blood hemocytes in the chamber (Ch) of the tube body 10 may be obtained.

In addition, the cross section of the collision barrier 32 is illustrated as a trapezoidal shape, but the present invention is not limited thereto. Any shapes that enable stable collision with blood during centrifugation and allow red blood cells to easily move downward may be used without particular limitation.

In the embodiments of FIGS. 1A to 4B, the cell activation part 30 includes the fine uneven walls 31 and the collision partitions 32. Fine protrusions 35 (FIG. 5) having a plurality of embossed patterns may be used instead of the fine uneven walls 31. When necessary, the fine uneven walls 31 and the fine protrusions 35 may be provided in combination.

That is, the cell activation part is formed in a protruding shape within the tube body 10 to collide with the blood. However, any shapes that may be provided on the inner surface of the chamber (Ch) or inside the chamber (Ch) and may apply physical stress to blood during centrifugation may be used without particular limitation.

In addition to the upper chamber 11, the cell activation part may also be provided in the lower chamber 13 as shown in FIG. 1B, when necessary.

The cell activation part formed in the lower chamber 13 may increase the frequency of physical collision with blood during centrifugation. Accordingly, cell separation efficiency may be increased by more effectively applying physical stress to blood.

Figure 4A:
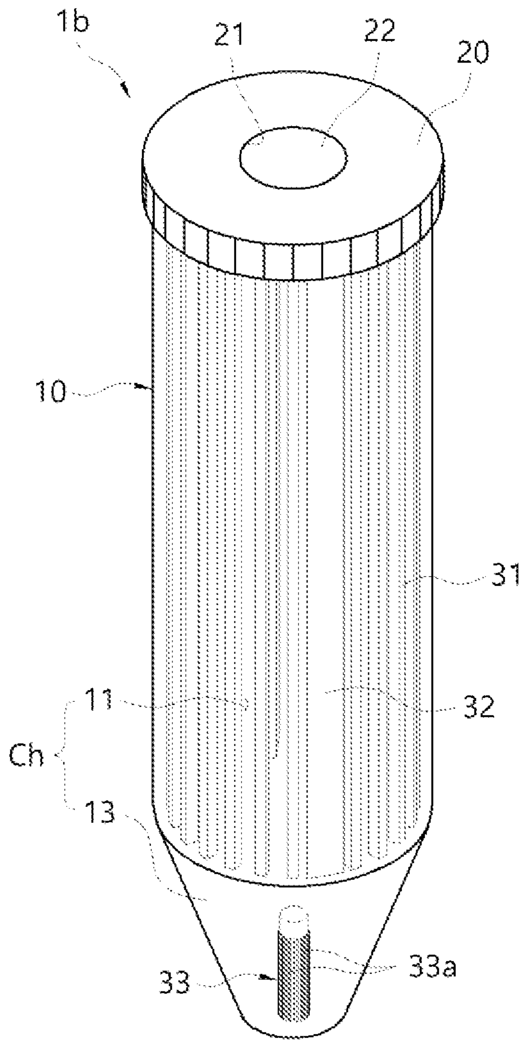
FIGS. 4A and 4B are diagrams showing an example of a blood separation tube including a cell activation part in the form of an activation column according to the present invention.
Figure 4B:
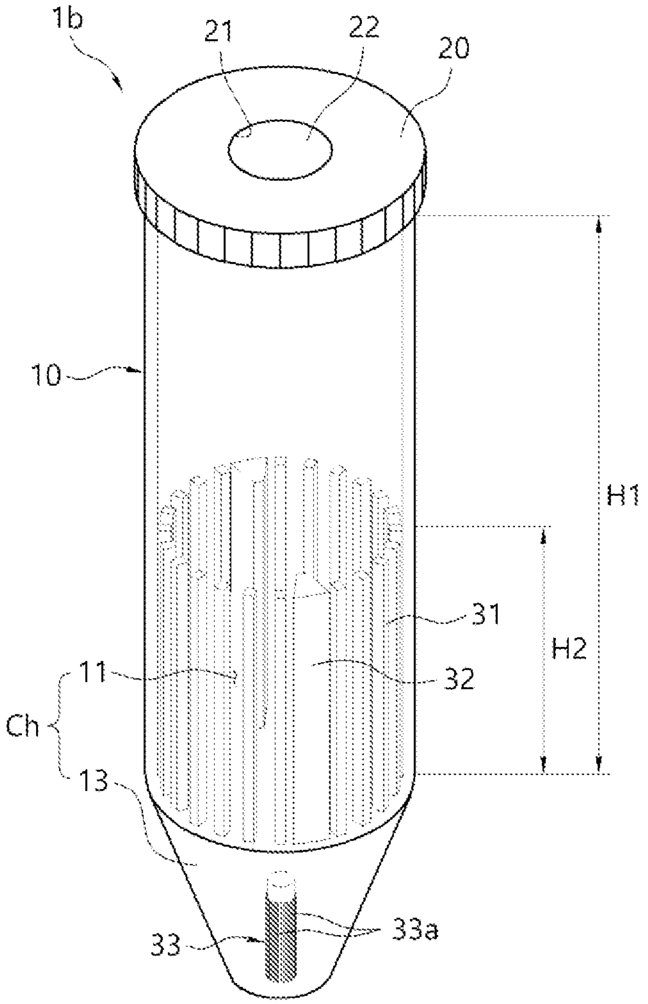

In addition, as shown in FIGS. 1B and 4B, the cell activation part formed in the upper chamber 11 may be located in the lower portion of the upper chamber 11. In this case, the cell activation part may be formed in the lower portion to have a height (H2) corresponding to about 45 to 50% of the total height (H1) of the upper chamber 11.

Hemocytes including red blood cells are cellular components that account for about 45% of the total blood volume. During centrifugation, hemocytes may get caught in the slightly protruding cell activation part. In this case, the hemocytes may not move to the lower portion and thus may not be separated.

To stably separate all hemocytes from blood and collect the hemocytes in the lower portion without being disturbed by the cell activation part, the cell activation part is preferably formed to have a height (H2) lower than the percentage of hemocytes of 45% relative to the total height (H1) of the upper chamber 11.

The height (H2) of the cell activation part may be adjusted according to the amount of hemocytes in blood so that the hemocytes and plasma of the centrifuged blood may be perfectly separated.

In addition, the tube body 10 constituting the above-described blood separation tube includes the upper stopper 20 to shield the upper portion of the open chamber (Ch) and maintain airtightness.

The upper stopper 20 is detachably coupled to the open upper portion of the tube body 10 through fitting or screw coupling and has a packing 22 into which a needle may be inserted. This upper stopper is a commonly known structure, and a detailed description thereof will be omitted in order not to obscure the gist of the present invention.

Figure 1B:
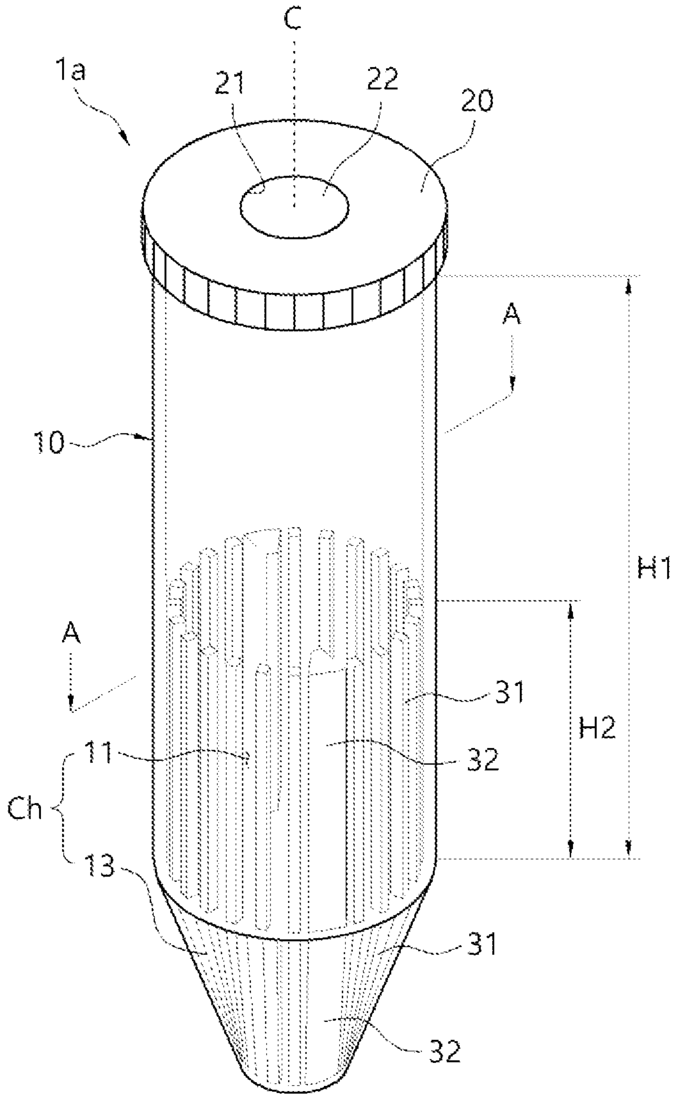
Figure 2:
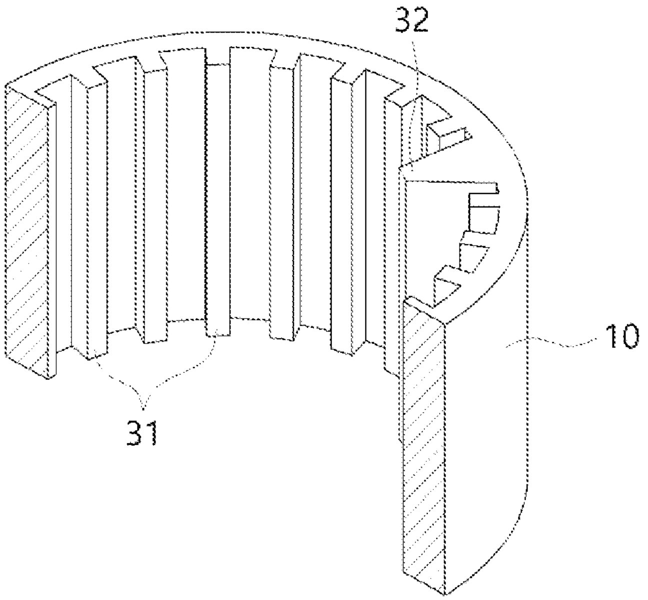
FIG. 2 is a cutaway perspective view of the main part of FIG. 1.
Figure 3:
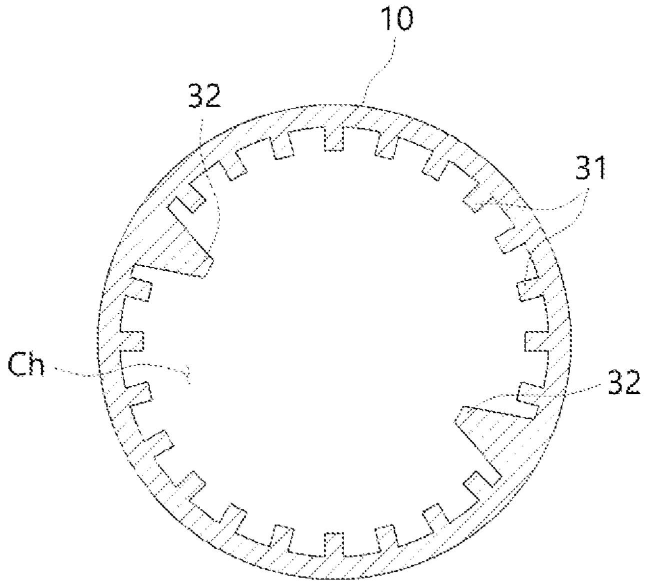
FIG. 3 is a cross-sectional view along line A-A of FIG. 1.

In addition, as shown in the embodiments of FIGS. 4A and 4B, in addition to the configuration of FIGS. 1A and 1B, the blood separation tube 1*b* including a cell activation part according to the present invention may further include, as a component of the cell activation part, a rod-shaped activation column 33 formed inside the lower chamber 13 and having an outer circumferential surface on which a plurality of fine uneven walls 33*a* protruding in the longitudinal direction are formed.

In this case, the fine uneven walls 33*a* are preferably formed at a predetermined interval along the outer circumferential surface of the activation column 33 in the chamber and placed parallel to the central axis.

The activation column 33 has a predetermined length and is configured to be accommodated inside the lower chamber 13. The activation column 33, as in the upper chamber 11, causes collision with white blood cells, lymphocytes, and platelets to occur in the center of the lower chamber 13 from the initial process of centrifugation to more efficiently apply physical stress to blood.

In addition, the activation column 33 serves to bend blood in the lower portion of the tube body 10, i.e., blood in the lower chamber 13, when the blood separation tube rotates in an angle-type centrifugation process. By this operation, white blood cells and platelets with low specific gravity existing between bulky red blood cells may easily rise to the middle layer of the blood separation tube, and a buffy coat may be easily formed.

In addition, the above-described fine uneven walls 33*a* have the same shape as the fine uneven walls 31 formed on the inner surface of the chamber. However, the present invention is not limited thereto, and the fine uneven walls 33*a* may be replaced with the fine protrusions 35 as in FIG. 5, or a combination of fine uneven walls and fine protrusions may be provided.

Figure 5:
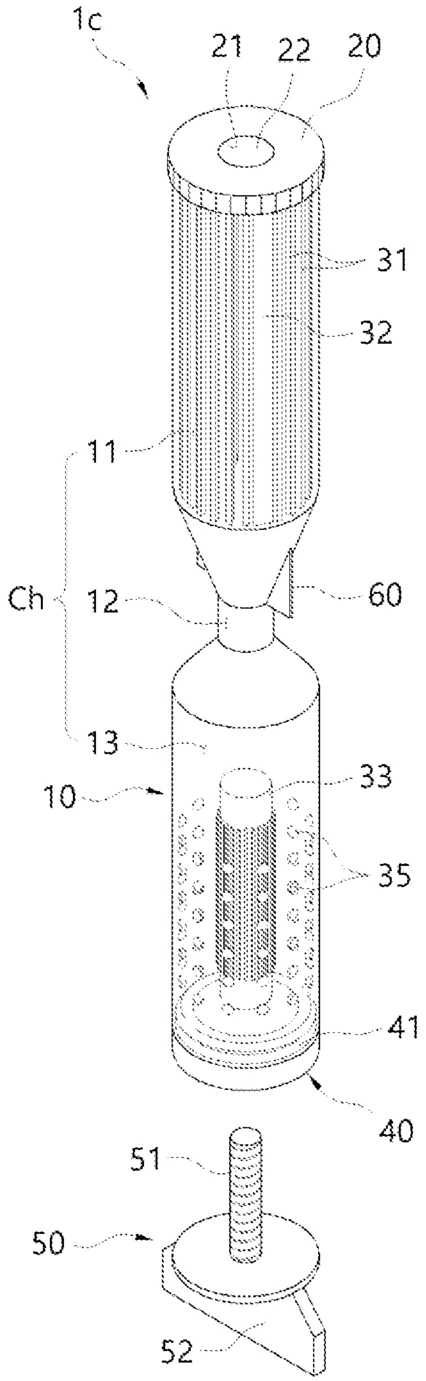
FIGS. 5 to 7 are diagrams showing examples having cell activation parts according to the shape of a tube body applied to a blood separation tube according to the present invention.
Figure 6:
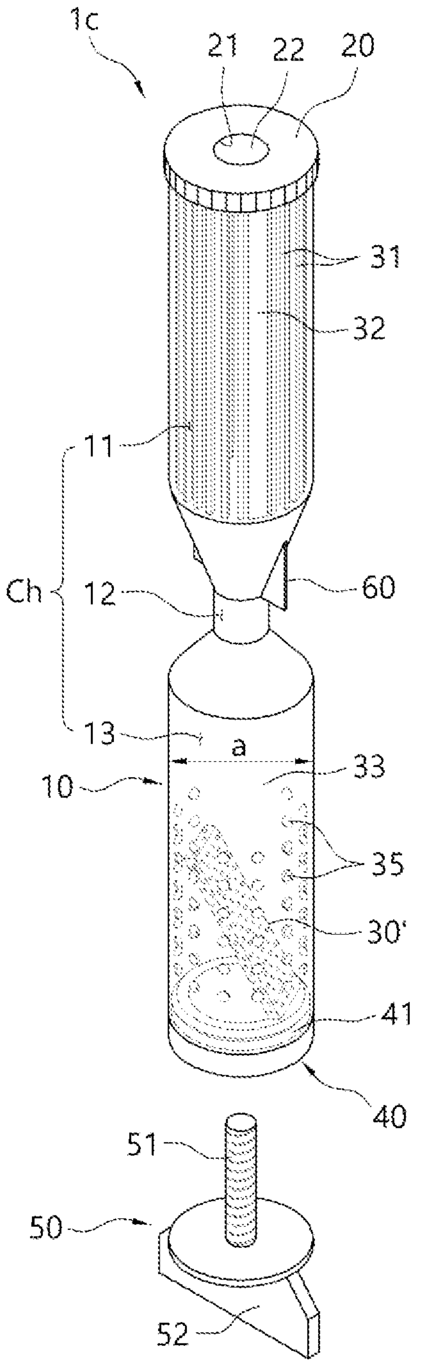
Figure 7:
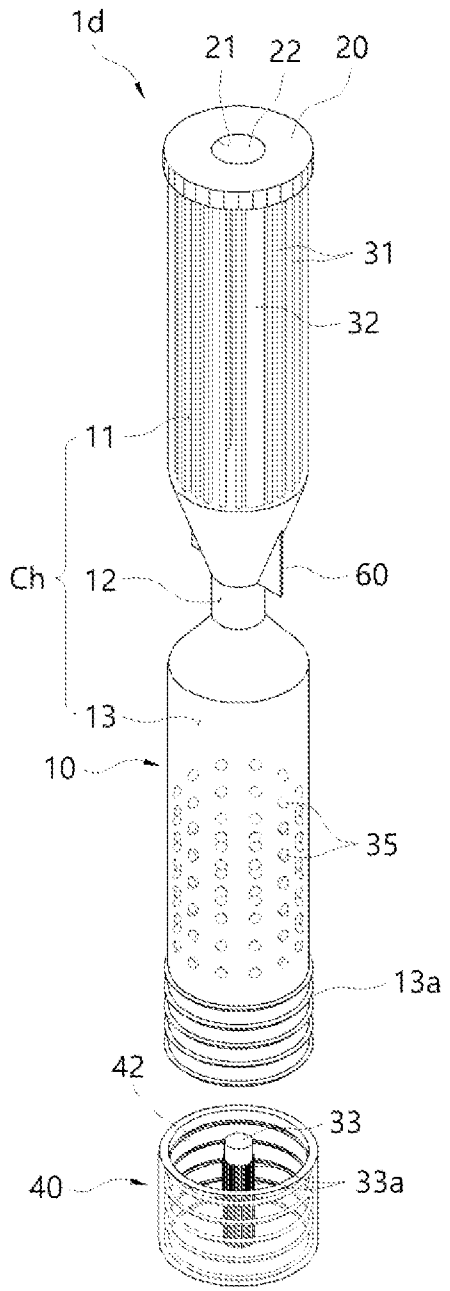

FIGS. 5 to 7 are diagrams showing embodiments having cell activation parts according to the shape of the tube body applied to the blood separation tube according to the present invention.

As shown in FIGS. 5 to 7, the blood separation tube including a cell activation part according to the present invention has a shape of the tube body 10 to improve centrifugal separation efficiency.

Blood separation tubes 1*c* and 1*d* including a cell activation part include a tube body having a chamber for receiving blood and a cell activation part formed in a protruding shape on the inner surface of the chamber or inside the chamber to activate blood cells by physical collision with centrifuged blood.

The chamber (Ch) consists of an upper chamber 11, an intermediate chamber 12, and a lower chamber 13.

The upper chamber 11 has an open upper portion and is formed in a cylindrical shape having a predetermined diameter and length.

The intermediate chamber 12 has a narrow tube portion gradually narrowing from the lower end of the upper chamber 11, has a predetermined diameter smaller than the diameter of the upper chamber 11, and has a cylindrical shape extending downward from the narrow tube portion.

In addition, the lower chamber 13 has a wide tube portion that gradually widens from the lower end of the intermediate chamber 12, has a predetermined diameter larger than the diameter of the intermediate chamber 12, and has a cylindrical shape extending downward from the wide tube portion.

Accordingly, during centrifugation, plasma of blood is collected in the upper chamber 11, a buffy coat containing white blood cells and platelets of blood is formed in the intermediate chamber 12, and red blood cells of blood are collected in the lower chamber 13.

At this time, a buffy coat may also be formed in the upper portion of the lower chamber 13 according to the component content of the centrifuged blood.

In addition, as shown in FIGS. 1A to 4B, the cell activation part including any one of the fine uneven walls 31 formed in a shape protruding in the longitudinal direction with a certain height and width on the inner surface of the chamber (Ch) of the tube body 10 and the fine protrusions 35 formed in a protruding shape on the inner surface of the chamber (Ch) may be formed in the upper chamber 11 or the lower chamber 13.

As shown in the figures, the fine uneven walls 31 are formed in the upper chamber 11, and the fine protrusions 35 of an embossed pattern are formed in the lower chamber 13. However, the present invention is not limited to this configuration, and the positions of the fine uneven walls 31 and the fine protrusions 35 may be interchanged or the fine uneven walls 31 and the fine protrusions 35 may be formed in combination.

In addition, when necessary, the cell activation part may be formed only in the lower chamber 13.

However, to facilitate separation of red blood cells having a high specific gravity during centrifugation and to prevent blood from sticking to the edges of the fine uneven walls 31 or the fine protrusions 35 constituting the cell activation part, the cell activation part is preferably formed as shown in FIGS. 5 to 7.

In addition, the cell activation part preferably further includes the collision partitions 32 formed to have a certain height and width in the longitudinal direction on the inner surface of the upper chamber 11, configured to protrude further toward the central axis than the fine uneven walls 31, and arranged at a predetermined interval.

Since the composition and role of the cell activation part has been described through the examples of FIGS. 1A to 4B, the description thereof will be omitted in order not to obscure the gist of the present invention.

In addition, as shown in the figures, the lower chamber 13 has a cylindrical shape with an open bottom.

In addition, the bottom of the lower chamber 13 is sealed by a lower portion stopper 40 including a lower portion packing 41 to maintain airtightness.

The entire or outer circumferential surface of the lower portion packing 41 is preferably formed of an elastic material. In this case, even under centrifugation load, the lower portion packing 41 adheres strongly to the inner surface of the lower chamber 13 to prevent blood from leaking.

The lower portion packing 41 and the lower portion stopper 40 have been described as separate components, but the lower portion packing may be a lower portion stopper or may be in the form of a stopper separately provided with packing as shown in the figure.

In addition, the lower portion stopper 40 or the lower portion packing 41 ascends or descends along the inner circumferential surface or outer circumferential surface of the lower chamber 13 by an external force according to the shape detachably coupled to the lower chamber 13.

Referring to FIGS. 5 and 6, the lower portion packing 41 is separately combined with the lower portion stopper 40 on the bottom surface of the lower chamber 13, and the lower portion packing 41 inside the lower chamber 13 is pushed by a separate member such as a piston 50 to ascend or descend along the inner circumferential surface of 13 of the lower chamber.

A separate lift rail 51 as a member for pushing up the lower portion packing 41 may be formed on the outer circumferential surface of the piston 50, and the lower portion packing 41 may be slowly pushed up or down through the lower portion stopper 40 of the tube body 10 corresponding to the lift rail 51. However, the present invention is not limited to this configuration, and a simple rod shape or the like may be used.

In addition, by forming a handle 52 on the piston 50, a medical staff may hold the handle 52 and support the piston 50 with the front parts of the fingers, so that the lower portion packing 41 may be pushed up with relatively little force.

Referring to FIG. 7, the lower portion stopper 40 has a threaded coupling structure detachably coupled to an external thread 13*a* formed on the outer circumferential surface of the lower portion of the lower chamber 13. Through this structure, the lower portion stopper 40 moves up and down along the outer circumferential surface of the lower portion of the lower chamber 13.

Although not shown in FIG. 7, lower portion packing (not shown) may be provided on the outer surface of the lower portion of the lower chamber 13.

In addition, the blood separation tube according to the present invention, as described above, has a rod shape inside the lower chamber 13 as a cell activation part, and may further include the activation column 33 having an outer circumferential surface on which a plurality of the fine uneven walls 33*a* protruding in the longitudinal direction or fine protrusions (not shown) are formed.

Referring to FIGS. 5 and 7, the activation column 33 is formed in the lower portion stopper 40 or the lower portion packing 41 and has a rod shape. On the outer circumferential surface of the activation column 33, the fine uneven walls 33*a* protruding in the longitudinal direction are formed. The activation column 33 may include a shape of fine protrusions. Since the composition and role of the activation column 33 have been described in FIGS. 4A and 4B, the detailed description will refer to the above description.

The activation column 33 is accommodated inside the lower chamber 13 by the lower portion stopper 40 or the lower portion packing 41.

As described above, in the blood separation tube according to an embodiment of the present invention, by centrifugation, plasma is collected in the upper portion and red blood cells are collected in the lower portion with respect to a buffy coat containing white blood cells and platelets.

When centrifugation is complete, plasma is extracted by inserting a syringe into the plasma layer of the tube body 10 through the upper portion packing 22 of the upper stopper 20, or the buffy coat and plasma are extracted by inserting a syringe into a white blood cell buffy coat of the tube body 10 through the upper portion packing 22.

At this time, since the buffy coat only accounts for about 1% of the total solution and is laid on the red blood cells as thinly as paper in a tube with a substantially wide diameter, it is very difficult even for an expert to separate the buffy coat.

However, as shown in FIGS. 5 to 7 of the present invention, in the tube body 10, a thick buffy coat is formed in the intermediate chamber 12 having a narrow diameter, so that the buffy coat may be easily extracted.

In addition, the lower portion packing 41 or the lower portion stopper 40 of the lower chamber 13 is lifted to move a buffy coat in the upper portion of the lower chamber 13 to the intermediate chamber 12 so that the buffy coat may be easily extracted.

In addition, the blood separation tube including a cell activation part of the present invention according to FIGS. 5 to 7 further includes an anti-vibration plate 60 provided integrally on the outer surface of the tube body 10 to prevent vibration of the tube body 10 during centrifugation.

The anti-vibration plate 60 allows the blood separation tube to be stably positioned in a centrifugal separator, absorbs generated vibration, and keeps the blood separation tube in place.

The anti-vibration plate 60 prevents the tube body 10 from shaking during centrifugation, thereby preventing blood layers from mixing, facilitating separation and extraction.

Figure 8:
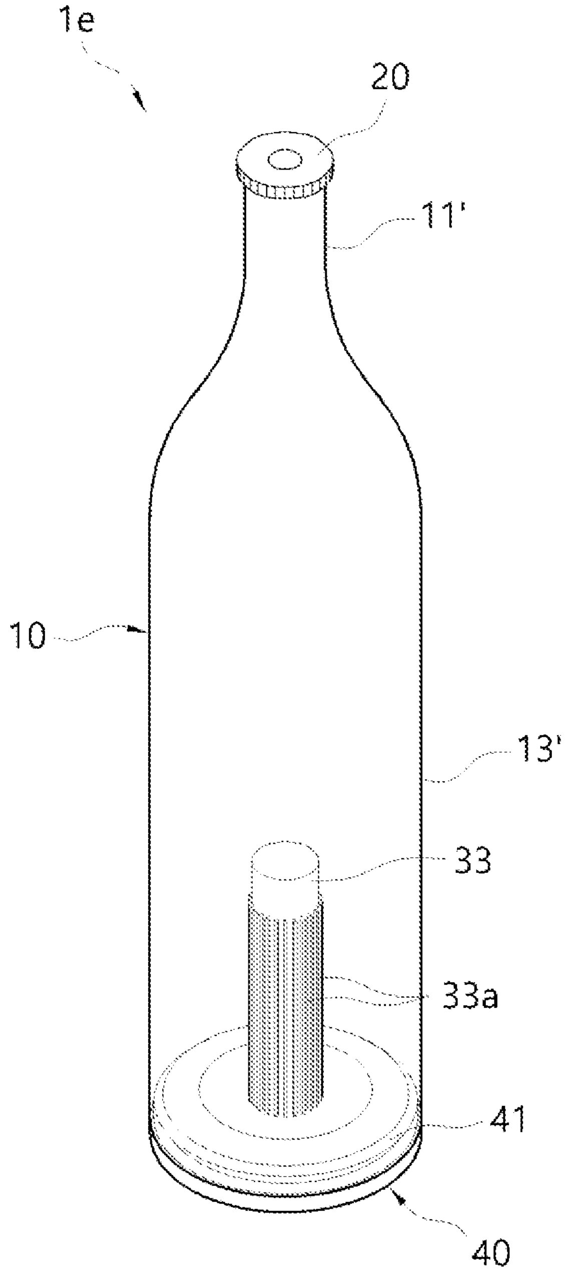
FIGS. 8 and 9 are diagrams showing examples having cell activation parts according to the shape of a tube body applied to a blood separation tube according to the present invention.
Figure 9:
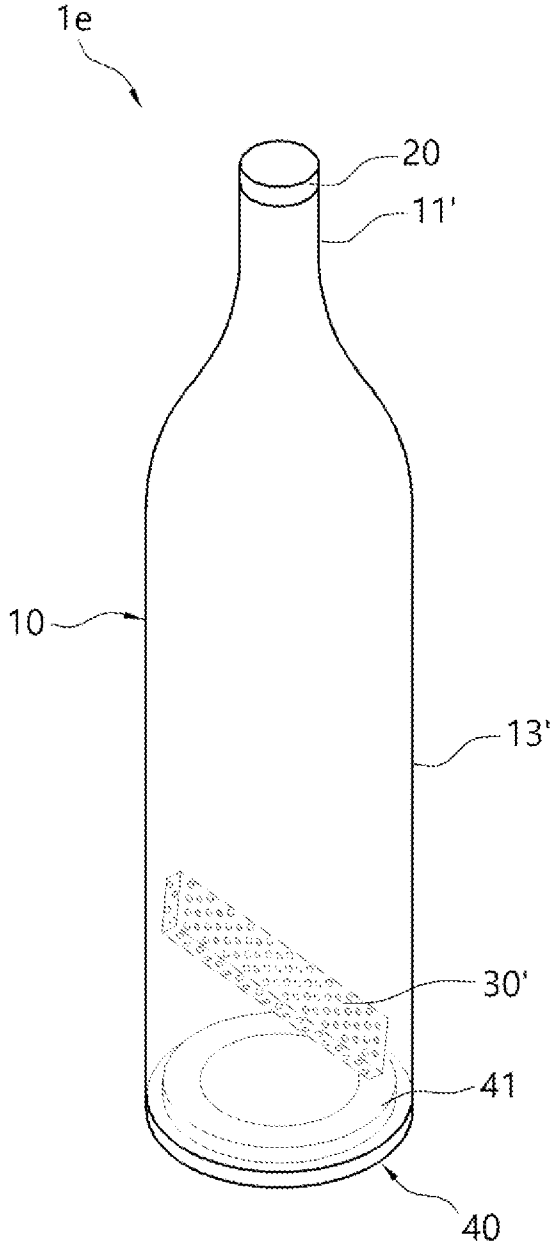

Next, FIGS. 8 and 9 show another type of tube body included in the blood separation tube including a cell activation part according to the present invention.

As shown in the figures, the blood separation tube 1*e* including a cell activation part has the bottle-shaped tube body 10 having a narrow neck (inlet).

Specifically, the chamber (Ch) of the tube body 10 consists of an upper chamber 11' having a predetermined small diameter and length and a lower chamber 13' of a cylindrical shape gradually expanding downward from the lower end of the upper chamber 11' and having a predetermined diameter and length greater than those of the upper chamber 11'.

In addition, as in the embodiments described in FIGS. 5 to 7, the lower chamber 13' has a cylindrical shape with an open bottom surface. The bottom surface is sealed by the lower portion packing 41 and the lower portion stopper 40 to maintain airtightness.

As shown in FIGS. 5 and 7, the lower portion packing 41 further includes the rod-shaped activation column 33 having an outer circumferential surface on which the fine uneven walls 33*a* protruding in the longitudinal direction are formed.

In addition, although not shown, protruding collision partitions (not shown) may also be formed on the activation column 33 at a predetermined interval.

In addition, as described in FIGS. 1A to 7, when necessary, the cell activation part formed on the inner surface of the chamber may be formed on the inner surface of the lower chamber 13'.

In addition, in the blood separation tube including a cell activation part according to the present invention, the cell activation part may include an activation bar 30' having embossed patterns 36 on the outer circumferential surface thereof to cause physical collision while flowing with blood during centrifugation (see FIGS. 6 and 9).

Figure 10:
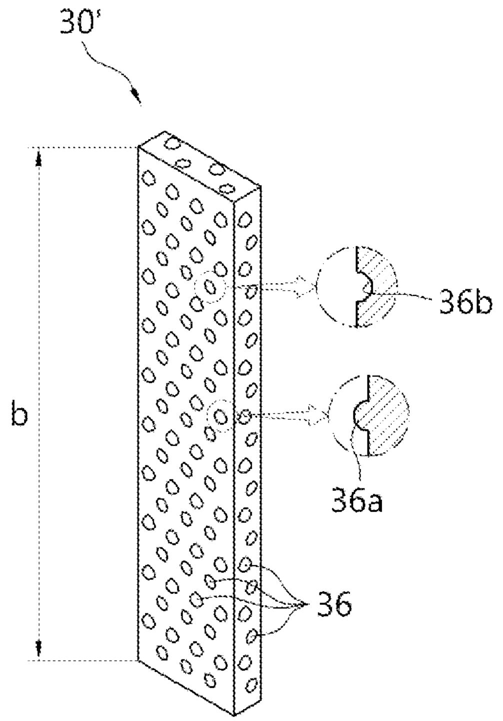
FIGS. 10 and 11 are diagrams showing examples of an activation bar constituting a cell activation part applied to a blood separation tube according to the present invention.

Specifically, referring to FIG. 10, the activation bar 30' has a length (b) greater than the width or diameter (a) (FIG. 6) of the chamber (Ch). On the outer circumferential surface of the activation bar 30', embossed patterns 36 in the form of fine grooves 36*b* or fine protrusions 36*a* are formed.

The embossed patterns 36 may be composed of the fine protrusions 36*a* or the fine grooves 36*b* alone or a combination thereof.

In addition, as shown in the figures, the activation bar 30' is configured in the form of a bar having a predetermined thickness and length and having a rectangular cross section, but the present invention is not limited thereto. Various forms capable of generating physical collision while being included in the chamber (Ch) and flowing with blood during centrifugation may be applied.

Figure 11:
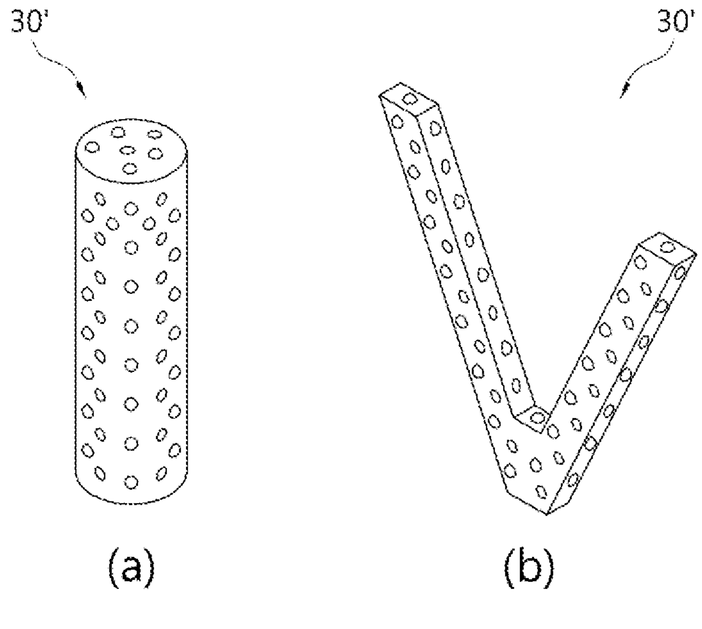

For example, referring to FIG. 11, the activation bar 30' may be a cylindrical bar having embossed patterns formed on the outer circumferential surface thereof or a V-shaped bar having embossed patterns formed on the outer circumferential surface thereof.

As in the activation column 33 above, the activation bar 30', which constitutes the cell activation part, stirs blood on the lower portion side when the blood separation tube rotates in an angle-type centrifugation process. Through this operation, white blood cells and platelets having a low specific gravity existing between bulky red blood cells are easily elevated to the middle layer of the blood separation tube, which increases blood separation efficiency.

In addition, the activation bar 30' may be applied to the embodiments of the present invention. At this time, the activation bar 30' may be applied in combination with the activation column 33 or the activation bar 30' may be applied alone.

In addition, the activation bar 30' may be provided in combination with the fine uneven walls 31, the collision partitions 32, and the fine protrusions 35 constituting the cell activation part, or the activation bar 30' may be provided separately.

Hereinafter, a method of operating the blood separation tubes 1*a*, 1*b*, 1*c*, 1*d*, and 1*e* including a cell activation part according to embodiments of the present invention will be described.

First, blood is collected from the patient's venous blood or bone marrow, and the collected blood is injected into the chamber (Ch) of the tube body 10 of the blood separation tube according to an embodiment of the present invention.

Next, the upper stopper 20 is coupled to the opening of the upper portion of the upper chamber 11 constituting the tube body 10, and the opening is sealed with the upper portion packing 22 to maintain airtightness in the chamber (Ch).

According to an embodiment, when the lower chamber 13 having an open bottom surface is included, the lower portion stopper 40 having the lower portion packing 41 is coupled to the lower chamber 13 so that the lower chamber 13 is sealed and airtightness in the chamber (Ch) is maintained.

Accordingly, the chamber (Ch) of the tube body 10 is separated from the outside. This structure prevents blood components from being exposed to the outside air during the process of separating the blood components, thereby preventing contamination of blood and increasing the storage period of blood.

Here, in a state in which the tube body 10 is combined with the upper stopper 20, collected blood may be injected into the chamber (Ch) of the tube body 10 through the upper portion packing 22 using a syringe.

Then, the blood separation tube containing the blood is mounted on the bucket of an angle-type centrifugal separator, and the blood is centrifuged by rotating the centrifugal separator at 2,000 to 4,000 rpm per minute.

At this time, since the anti-vibration plate 60 is provided in the blood separation tube, shaking during centrifugation is prevented.

In addition, blood components are separated by difference in specific gravity during centrifugation. That is, among blood components, heavy red blood cells sink to the lower chambers 13 and 13' of the chamber (Ch), relatively light monocytes, white blood cells, lymphocytes, and platelets are collected in the center of the chamber (Ch) or the intermediate chamber 12, and plasma is collected in the upper chambers 11 and 11'.

In addition, during blood centrifugation, blood swirls in the chamber (Ch) of the tube body 10.

That is, a vortex of blood occurs in the chamber 11 of the tube body 10, and at this time, hemocytes also flow rapidly. While the blood is flowing, the blood collides with the fine uneven walls 31 formed on the inner surface of the tube body 10, and physical stress is applied to the blood. The blood collides as the blood rotates thousands of times per minute.

In addition, by the collision partitions 32 formed on the inner surface of the tube body 10, blood located outside the tube body 10 with respect to the center of the tube body 10 and blood located inside the tube body 10 may be evenly mixed. As a result, an effect of evenly applying physical stress to hemocytes included the blood accommodated in the tube body 10 may be obtained.

When centrifugation of blood is completed, due to difference in specific gravity, heavy red blood cells are collected in the lower chamber 13 to form a red blood cell layer, a buffy coat containing white blood cells and platelets is stacked on the red blood cell layer, and a plasma layer is stacked on the buffy coat and is formed in the upper chamber 11. Accordingly, the blood is separated into the red blood cell layer, the buffy coat, and the plasma layer.

Then, a syringe may be inserted through the upper portion packing 22 into the plasma layer formed in the tube body 10 and plasma may be extracted, or a syringe may be inserted through the upper portion packing 22 into the buffy coat formed in the tube body 10 and the buffy coat and plasma may be extracted.

When necessary, as shown in FIGS. 5 to 9, extraction may be performed more easily by lifting the lower portion packing 41 or the lower portion stopper 40 to collect the buffy coat in a narrow area.

In addition, the cell activation part may be configured in the form of the activation column 33 or the activation bar 30' in the lower portion of the chamber (Ch). The activation column 33 and the activation bar 30' stir blood on the lower portion side of the tube body 10 in an angle-type centrifugation process. Through this operation, white blood cells and platelets having a low specific gravity existing between bulky red blood cells are easily elevated to the middle layer of the blood separation tube, which increases blood separation efficiency.

In the present invention described above, a person having ordinary knowledge in the technical field to which the invention pertains can make various modifications and changes within the scope that does not deviate from the technical idea of the present invention. Accordingly, the present invention is not limited to the above embodiments and accompanying drawings.

The invention claimed is:

1. A blood separation tube, comprising:

a tube body having a chamber for receiving blood; and a cell activation part provided in a protruding shape on an inner surface of the chamber or inside the chamber to activate blood cells by physically colliding with centrifuged bloods wherein the cell activation part comprises any one of a plurality of uneven walls formed on an inner surface of the chamber, having a certain height and width, and configured to protrude in a longitudinal direction and a plurality of protrusions formed on the inner surface of the chamber, arranged at a certain interval, and configured to protrude, and wherein the cell activation part further comprises a rod-shaped activation column formed on a lower portion of the chamber and having an outer circumferential surface on which a plurality of uneven walls or protrusions protruding in a longitudinal direction is formed.

2. The blood separation tube according to claim 1, wherein the cell activation part is an activation bar installed in the chamber, having a length greater than a width or diameter of the chamber, and having an outer circumferential surface on which embossed patterns in a form of grooves or protrusions are formed.

3. The blood separation tube according to claim 1, wherein the chamber consists of an upper chamber of a cylindrical shape having a predetermined diameter and length and a lower chamber connected to the upper chamber and configured to extend from a lower end of the upper chamber while narrowing downward.

4. The blood separation tube according to claim 1, wherein the chamber consists of an upper chamber having a predetermined diameter and length and a lower chamber of a cylindrical shape configured to extend from a lower end of the upper chamber while widening downward and having a predetermined diameter and length greater than those of the upper chamber.

5. The blood separation tube according to claim 1, wherein the cell activation part further comprises a plurality of collision partitions formed to have a certain height and width in a longitudinal direction on the inner surface of the chamber and configured to protrude further than the uneven walls or the protrusions.

6. The blood separation tube according to claim 5, wherein the uneven walls and the collision partitions are placed parallel to a central axis of the tube body.

7. The blood separation tube according to claim 1, wherein the chamber consists of an upper chamber of a cylindrical shape having a predetermined diameter and length; an intermediate chamber of a cylindrical shape having a narrow tube portion narrowing from a lower end of the upper chamber, having a predetermined diameter less than a diameter of the upper chamber, and configured to extend downward from the narrow tube portion; and a lower chamber of a cylindrical shape having a wide tube portion widening from a lower end of the intermediate chamber, having a predetermined diameter greater than a diameter of the intermediate chamber, and configured to extend downward from the wide tube portion.

8. The blood separation tube according to claim 7, wherein the cell activation part comprises any one of a plurality of uneven walls formed on an inner surface of the chamber, having a certain height and width, and configured to protrude in a longitudinal direction and a plurality of protrusions formed on the inner surface of the chamber at a predetermined interval and configured to protrude, and the cell activation part is formed in any one of the upper chamber and the lower chamber.

9. The blood separation tube according to claim 8, wherein the cell activation part further comprises a plurality of collision partitions formed to have a certain height and width in a longitudinal direction on an inner surface of the upper chamber, configured to protrude further than the uneven walls or the protrusions, and disposed at a predetermined interval.

10. The blood separation tube according to claim 7 or 4, wherein the lower chamber further comprises a lower portion stopper detachably coupled thereto by comprising lower portion packing for sealing an opened bottom surface.

11. The blood separation tube according to claim 10, wherein the cell activation part further comprises a rod-shaped activation column formed on the lower portion stopper or the lower portion packing and having an outer circumferential surface on which a plurality of uneven walls or protrusions protruding in a longitudinal direction is formed.

12. The blood separation tube according to claim 10, wherein the lower portion stopper or the lower portion packing is configured to move up and down along an inner circumferential surface or outer circumferential surface of the lower chamber by an external force.

* * * * *